United States Patent Office.

JOHN KIRKMAN, OF PEORIA, ILLINOIS.

Letters Patent No. 71,499, dated November 26, 1867.

---

IMPROVED PROCESS OF CLEANING COTTON-SEED.

---

*The Schedule referred to in these Letters Patent and making part of the same.*

---

TO ALL WHOM IT MAY CONCERN:

Be it known that I, JOHN KIRKMAN, of Peoria, in the county of Peoria, and State of Illinois, have invented a new and improved Process for Cleaning Cotton-Seed; and I do hereby declare the following to be a full, clear, and exact description of the same.

In this invention the cotton-seed is cleaned by the action of sulphuric or other acid which will separate the fibre from the kernel.

In planting cotton-seed great difficulty is experienced from the fact that a thick mat of fibre clings tenaciously to the kernel and prevents the seed from running freely from the seed-box. I have discovered a practicable method of thoroughly cleansing the kernel from every particle of fibre clinging to it, and rendering the seed as smooth and as easily operated within the common seeding-machine as are wheat, peas, or any other seed.

My process is simply to submit the rough cotton-seed for a short time to the action of sulphuric acid, which will completely cleanse the seed from the fibre. The acid should not be applied so long as to impair the vitality of the seed; but, by observing the proper mean, the kernel may be effectually cleansed, while preserving its vitality and vigor without diminution. The length of time that the acid and seed shall remain in contact will depend upon the strength of the acid.

To accomplish this purpose any apparatus may be employed which will bring the acid thoroughly in contact with the seed and enable the operator to separate them and recover the acid and seed. A common glass or porcelain vessel will answer for conducting the operation on a small scale, and it may be enlarged at pleasure. The acid may be recovered and used several times. The seed should be washed clean immediately in cold water after being taken from the acid. The cotton fibre acted upon by the acid may be put to a variety of uses, as in the manufacture of gun-cotton, etc. Thus all the elements used and products resulting may be recovered and utilized in such a manner as to render the process cheap and practicable.

Any other acid may be used in place of sulphuric, which will answer the purpose as well, and may be used separately or in combination.

Having thus described my invention, what I claim as new, and desire to secure by Letters Patent, is—

The process of cleansing cotton-seed by the action of sulphuric or other acid, either separately or combined, substantially as and for the purpose above described.

To the above specification of my invention I have signed my hand, this 26th day of September, 1867.

JOHN KIRKMAN.

Witnesses:
OTTO TRIEBEL,
WILLIAM JACK.